(12) United States Patent
Slovetskiy

(10) Patent No.: US 11,412,058 B2
(45) Date of Patent: Aug. 9, 2022

(54) DISTRIBUTED DATA STREAM PROGRAMMING AND PROCESSING

(71) Applicant: T-Mobile USA, Inc., Bellevue, WA (US)

(72) Inventor: Sergey Slovetskiy, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/821,925

(22) Filed: Mar. 17, 2020

(65) Prior Publication Data

US 2021/0297499 A1 Sep. 23, 2021

(51) Int. Cl.
*H04L 67/1004* (2022.01)
*G06F 9/54* (2006.01)
(Continued)

(52) U.S. Cl.
CPC .......... *H04L 67/2833* (2013.01); *G06F 9/546* (2013.01); *H04L 67/1004* (2013.01); *H04L 67/125* (2013.01); *H04W 72/005* (2013.01)

(58) Field of Classification Search
CPC .............. H04L 67/2833; H04L 67/125; H04L 67/1004; H04L 1/0002; H04L 67/12; H04L 1/0041; H04L 1/18; H04L 5/0064; H04L 67/1097; H04L 43/062; H04L 47/10; H04L 67/306; H04L 67/1002; H04L 67/02; H04L 41/12; H04L 41/5009; H04L 43/08; H04L 43/16; H04L 47/2483; H04L 63/1425; H04L 63/20; H04L 12/1818; H04L 51/32; H04L 67/1025; H04L 67/28; H04L 1/0009; H04L 1/1874; H04L 63/083; H04L 63/0853; H04L 65/403; H04L 67/42; H04L 12/6418; H04L 47/19; H04L 61/1511; H04L 63/0209; H04L 63/102; H04L 67/10; H04L 69/16; H04L 1/187; H04L 41/0896; H04L 67/1029; H04L 67/1031; H04L 67/1036; H04L 12/18; H04L 12/4633;
(Continued)

(56) References Cited

U.S. PATENT DOCUMENTS

2005/0185643 A1* 8/2005 Goldberg ................. H04J 3/14
370/389
2008/0133891 A1* 6/2008 Salz ......................... G06F 8/30
712/220

(Continued)

OTHER PUBLICATIONS

Apache Kafka—https://kafka.apache.org/.
(Continued)

*Primary Examiner* — Djenane M Bayard
(74) *Attorney, Agent, or Firm* — Han Santos, PLLC

(57) ABSTRACT

Techniques are described herein for distributed data stream programming and processing. The techniques include sending a request indicating one or more regions of a program code to access a stream in a stream pool and to execute on a processing node in a processing nodes pool. The techniques also include accessing the stream defined in the one or more regions of the program code to service the request. Thereafter, the processing node is selected to use for execution of the one or more regions of the program code and the processing node executes one or more instances of the one or more regions of the program code.

20 Claims, 5 Drawing Sheets

(51) Int. Cl.
*H04L 67/125* (2022.01)
*H04L 67/566* (2022.01)
*H04W 72/00* (2009.01)

(58) Field of Classification Search
CPC ........... H04L 2209/38; H04L 2209/805; H04L 2463/141; H04L 2463/146; H04L 29/06; H04L 29/06027; H04L 29/12066; H04L 29/12433; H04L 43/50; H04L 51/02; H04L 61/2061; H04L 61/2539; H04L 63/0421; H04L 63/1408; H04L 63/1458; H04L 65/1016; H04L 65/602; H04L 65/604; H04L 67/04; H04L 67/1095; H04L 67/2819; H04L 67/2842; H04L 67/303; H04L 67/34; H04L 69/08; H04L 69/329; H04L 69/40; H04L 9/3239; H04L 67/2814; H04L 67/2809; G06F 9/546; H04W 72/005
See application file for complete search history.

(56) References Cited

U.S. PATENT DOCUMENTS

| | | | |
|---|---|---|---|
| 2009/0089325 A1* | 4/2009 | Bradford | H04L 41/147 |
| 2009/0089352 A1* | 4/2009 | Davis | H04N 21/812 |
| | | | 709/201 |
| 2009/0300615 A1* | 12/2009 | Andrade | G06F 16/24568 |
| | | | 718/100 |
| 2017/0289240 A1* | 10/2017 | Ghare | H04L 67/10 |

OTHER PUBLICATIONS

Apache Pulsar—https://pulsar.apache.org/.
Apache Storm—https://storm.apache.org/.
F. Darema, D. A. George, V. A. Norton, and G. F. Pfister, "A single-program-multiple-data computational model for EPEX/FORTRAN," Parallel Computing, vol. 7, No. 1, pp. 11-24, Apr. 1988.
Kafka KSQL—https://github.com/confluentinc/ksql, printed via Archive.org (Year: 2019).
MPI (Message Passing Interface) Forum—https://www.mpi-forum.org/.
SQLStream SQL extensions—https://sqlstream.com/docs/sqlrf_sqlextensions.html, printed via Archive.org (Year: 2017).
StreamSQL—https://en.wikipedia.org/wiki/StreamSQL.

* cited by examiner

DISTRIBUTED DATA STREAM PROGRAMMING AND PROCESSING

BACKGROUND

Many specialized systems have been designed to process parallel data streams generated on the Internet and by a massive number of the Internet of Things (IoT) devices and applications. Some of the systems have been open-sourced and used as the basis of general data processing applications. However, the origin of these systems lies in the applicability to a specialized application and requires limitations of using a general programming language and adhering to specific terminology.

Single Program Multiple Data (SPMD) programming model has been widely accepted in the High-Performance Computing (HPC) community for parallel computations, but not for distributing processing of data streams. Additionally, Message Passing Interface (MPI) is one standardized example of using the SPMD paradigm for programming of parallel HPC, generally using batch-type distributed processing, and implemented for various programming languages, but not for the computation on data streams.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Figure 1:
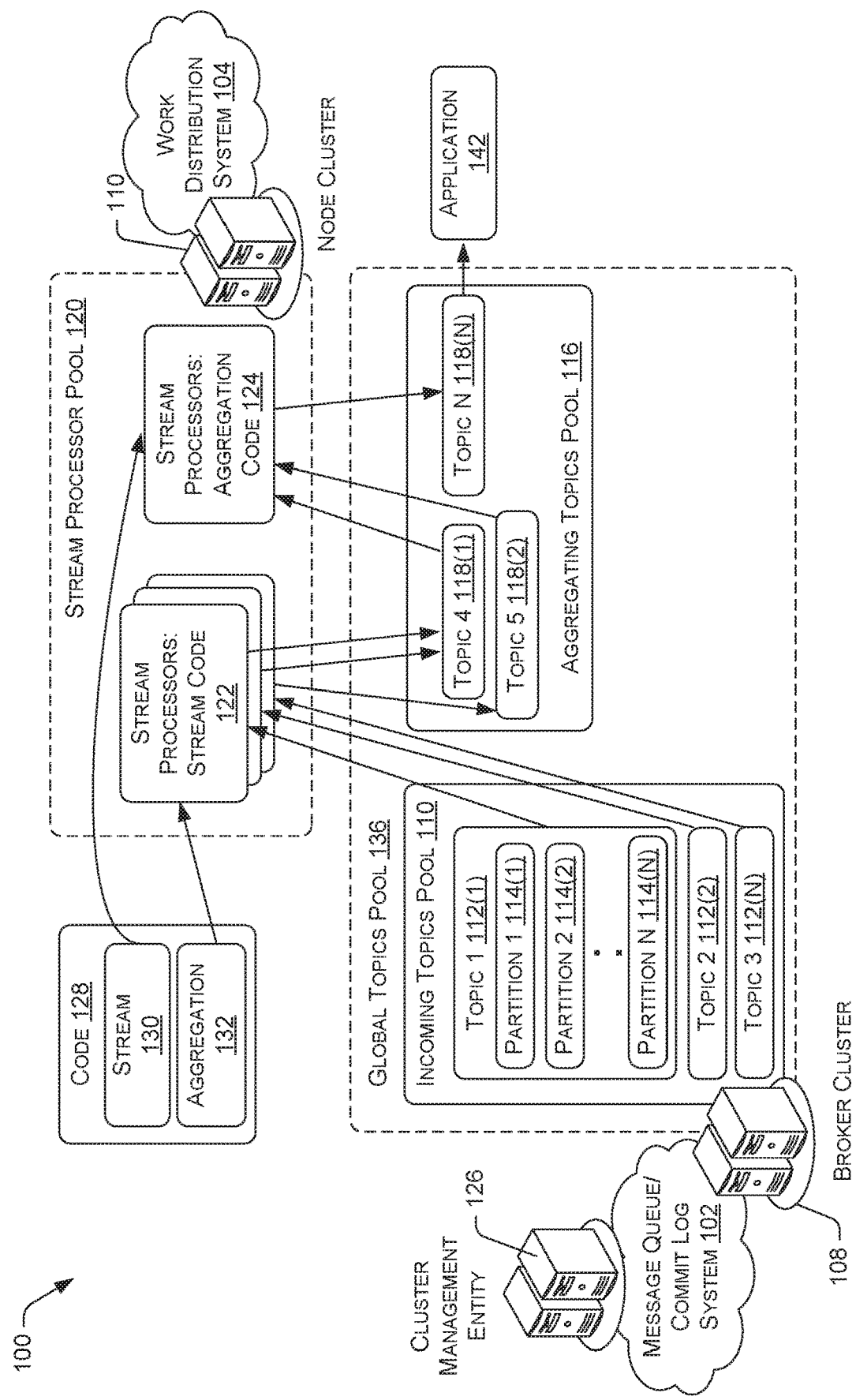
FIG. 1 illustrates an example of a stream processing cluster architecture for deploying a dynamic pool of computing nodes to perform distributed data stream programming and processing.

This disclosure is directed to techniques for deploying a dynamic pool of computing nodes to perform distributed data stream programming and processing in a work distribution system. In some aspects, the system comprises a stream processor pool of processing nodes performing computational jobs on streams and serving the stream processing jobs. The system also includes a messaging/log queue system that supports data streams generalized as topics. The message queue/commit log system may include a message server that employs one or more broker instances (i.e., a broker cluster) that implements an abstracted pool of topics stored as streams.

A general-purpose programming language (e.g., Structured Query Language [SQL]) aimed at data manipulation is extended to specify the calculation topology and partition the calculations in the program code (i.e., which parts of the program execute on which node or set of nodes, and then communicate with which stream, partition, or a combination thereof). In some aspects, the code may be marked up with either language-specific keywords mapping to an application programming interface (API) or with the language-generic pragma code words wrapped up in comments of the programming language.

The code words or keywords are global descriptors that expose information such as the global count of processing nodes in the cluster, the rank or the name of the processing node where the specific program executable code is running, global count of streaming topics in the broker cluster, the rank of the topic, the section of the code processing, the name of the topic, capability to group streams or topics into programmatically defined groups, capability to group processing nodes into programmatically defined groups, capability to assign stream processing to specific processing nodes, capability to assign stream operations and input/output to the data from specific streams or groups of streams, and capability to exchange data between executable code copies executed on specific processing nodes.

The program is distributed to all processing nodes in the stream processor pool and has access to all streams in the system. A stream processing node that is receiving a data stream extracts the descriptors (e.g., rank or the name of the processing node where the specific program executable code is running) from the data stream. Because the describers are maintained and then automatically propagated to the executing program on each node in the stream processor pool (e.g., via an API), any node in the stream processor pool can start and stop processing at any time. Additionally, streams can be referenced by the program code. In some aspects, both hard-coded (low level) and dynamic (high level) allocation of calculations to nodes and streams may be provided for dynamic scaling up and down of the whole stream processing system.

The message queue/commit log system may be connected to a cluster management entity. The cluster management entity may be a centralized service that is used to manage and maintain naming and configuration data and to provide synchronization within broker instances in the broker cluster and processing nodes in the work distribution system. Additionally, global descriptors are maintained at the cluster management entity and then exposed to the executing program on each processing node via an API. Accordingly, the data within the cluster management entity is divided across multiple collections of broker instances.

Accordingly, techniques herein provide a standardized approach to abstract multiple data streams in the system and eliminate manual specification in the code of a processing node and stream. This allows dynamic scaling of the data processing pipeline based on demand and dynamic computation load balancing because each processing node does not require a customized program specifying the node identifier and specific streams to read from and write to.

The techniques described herein may be implemented in a number of ways. Example implementations are provided below with reference to the following figures.

Example Network Architecture

FIG. 1 illustrates an example of a stream processing cluster architecture 100. The architecture may include a message queue/commit log system 102 and a work distribution system 104. The message queue/commit log system 102 and the work distribution system 104 may be connected to a number of other computing systems (e.g., IoT devices) via a network (e.g., a cellular network) or a collection of networks (e.g., the Internet).

The message queue/commit log system 102 may include a message server that employs one or more broker instances (i.e., a broker cluster 108) that implements an abstracted pool of topics or streams. The broker cluster 108 provides message delivery services for the message queue/commit log system 102. While the architecture 100 includes a single broker cluster 108, the message queue/commit log system 102 can be expanded to include multiple clusters without downtime. Message delivery relies upon a number of supporting components that handle connection services, message routing and delivery, persistence, security, and logging, as further discussed below.

The message queue/commit log system 102 may comprise additional components. For instance, the message queue/commit log system 102 may include the message queue client run-time (shown in FIG. 2) that provides a client application with an interface to the message server. The message queue/commit log system 102 may also include a cluster management entity 126. The cluster management entity 126 may be a centralized service that is used to manage and maintain naming and configuration data and to provide synchronization within broker instances in the broker cluster 108 and processing nodes in the work distribution system 104.

In one aspect, the configuration data may include information relating to topics (i.e., the subject of the information that is published in a publish/subscribe message) including the list of existing topics, the number of partitions for each topic, the location of all the replicas, the list of configuration overrides for all topics, and the status of the broker cluster 108 including the broker identified as the controller (i.e., the preferred leader). The data within the cluster management entity 126 is divided across multiple collections of broker instances. The cluster management entity 126 also maintains access control lists for all the topics or streams.

The cluster management entity 126 allows multiple client applications to perform simultaneous reads and writes and acts as a shared configuration service within the message queue/commit log system 102. The cluster management entity 126 may include a service discovery component (shown in FIG. 2). In the case where a broker fails, the service discovery component notifies the cluster management entity 126 and determines to which service instance it should connect a client. In some aspects, the service discovery component may include a load balancing layer to determine to which backend service it should route a client request. The load balancing layer can implement random allocation, round-robin allocation, weighted allocation, dynamic load balancing (e.g., least number of connections), and/or so forth.

In response, the cluster management entity 126 can perform instant failover migration and a client connecting to the broker can query a different broker if the first one fails to respond. In this regard, the cluster management entity 126 maintains a list of all the brokers in the broker cluster 108 that are functioning at any given moment and that is a part of the broker cluster 108. For instance, the cluster management entity 126 keeps track of the controller, which has the responsibility to maintain the leader-follower relationship across all the partitions. If a broker shuts down, the controller notifies the replicas to act as partition leaders to fulfill the duties of the partition leaders on the broker that is about to fail. Thus, whenever a broker shuts down, a new controller can be elected and at least one controller is designated.

The broker cluster 108 may comprise an incoming topics pool 110. The incoming topics pool 110 includes one or more topics 112(1)-112(N) or streams. Each data stream maps to the one or more topics 112(1)-112(N), which in turn comprise one or more partitions 114(1)-114(N). Thus, the data streams can be partitioned and spread over a cluster of machines to allow data streams larger than the capability of any single machine and to allow clusters of coordinated consumers. The individual topics or partitions can be dynamically referenced by program code 128 comprising streaming code 130 and aggregation code 132. The one or more topics 112(1)-112(N) and/or partitions 114(1)-114(N) can be grouped into a set and/or a subset, depending upon embodiments. For example, the first topic 112(1) and the second topic 112(2) can be grouped in a set. Additionally, the first partition 114(1) and the second partition 114(2) can be grouped in a sub set.

The individual topics 112(1)-112(N), partitions 114(1)-114(N), and sets or subsets may be associated with a name. The individual topics 112(1)-112(N), partitions 114(1)-114(N), and sets or subsets may also be associated with a stream rank or a topic rank. In this way, computing nodes can write to and read from a topic or group of topics specified either by stream rank or by a set or a range of stream ranks or by specific names. If a set or a range of topics or streams is provided, different code instances may read messages, for example, in a round-robin fashion. In some aspects, the individual topics 112(1)-112(N) and the partitions 114(1)-114(N) may be associated with a log/offset, which may be stored in the cluster management entity 126. Consumers can read topics and pick where they are (i.e., offset) in the log. Each consumer group may track offset from where they left off reading.

The incoming topics pool 110 may be a component of a global topics pool 136 or a stream sources pool, which may also include an aggregating topics pool 116. The aggregating topics pool 116 includes an aggregate of all the streams received by stream servers. Similar to the incoming topics pool 110, the aggregating topics pool 116 also includes one or more topics 118(1)-118(N). The topics 118(1)-118(N) can comprise a functional subset of streams (e.g., aggregated data). The individual topics 118(1)-118(N) may also include one or more partitions. The individual topics 118(1)-118(N) and the one or more partitions may be specified either by stream rank or by a set or a range of stream ranks or by specific names. A generally dynamic set of topics is assumed to be available in the global topics pool 136. The global count, names, and ranks of topics in the global topics pool 136 may change dynamically, resulting in a change of the values exposed to program instances executing on specific nodes.

The work distribution system 104 comprises a stream processor pool 120 of stream processors 122 and 124. The stream processors 122 and 124 can be deployed in a node cluster 110 that can be scaled up or down. The program is propagated throughout the stream processor pool 120 and the stream processors 122 and 124 in the node cluster 110 perform computational jobs on streams and serve the stream processing jobs. In the illustrated embodiment, the stream processor pool 120 can include a first sub-pool of stream processors 122 that process stream code 130 and a second sub-pool of stream processors 124 that process aggregation code 132 in a streaming pipeline. The stream processors 122 and 124 can be grouped into a set and/or a subset, depending upon embodiments.

The total number of the stream processors 122 and 124 is specified and can be queried. The individual processors 122 and 124 are also uniquely identified (e.g., integer or name) and ranked. The identity and the rank of the individual processors 122 and 124 can be queried from the code 128. Thus, specific parts of the program code 128 may be executed on specific nodes in the stream processor pool 120 as specified in the programming language.

The various computing nodes in the message queue/commit log system 102 and the work distribution system 104 as described herein may include general-purpose computers, such as desktop computers, tablet computers, laptop computers, servers (e.g., on-premise servers), or other electronic devices that are capable of receiving input, processing the input, and generating output data. The computing nodes may store data in a distributed storage system, in which data may be stored for long periods and replicated to guarantee reliability.

Accordingly, the computing nodes may provide data and processing redundancy, in which data processing and data storage may be scaled in response to demand. Further, in a networked deployment, new computing nodes may be added. Thus, the computing nodes can include a plurality of physical machines that may be grouped and presented as a single computing system. Each physical machine of the plurality of physical machines may comprise a node in a cluster. The computing nodes may also be in the form of virtual machines, such as virtual engines (VE) and virtual private servers (VPS).

Figure 2:
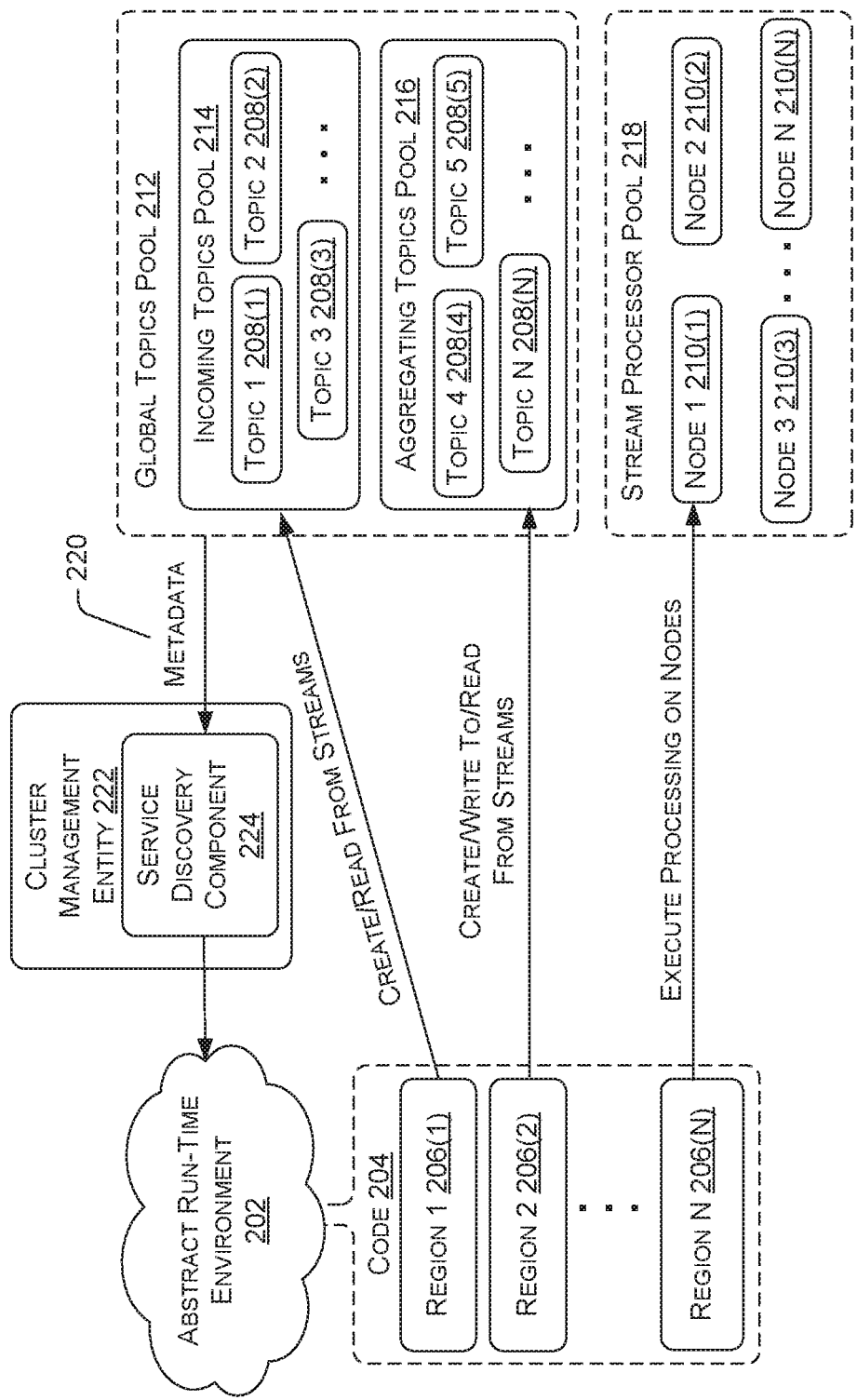
FIG. 2 illustrates the Single Program Multiple Data (SPMD) stream and node processing architecture, deployment, processing, and dynamic service discovery.

FIG. 2 illustrates the SPMD stream and node processing architecture, deployment, processing, and dynamic service discovery. The abstract client run-time environment 202 provides client applications with an interface to the message server of a messaging/log queue system such as the message queue/commit log system 102 of FIG. 1. The abstract client run-time environment 202 supports all operations needed for clients to send messages to destinations and to receive messages from such destinations.

During message production, messages are created by a client and sent over a connection to a destination on a broker (i.e., in a broker cluster 108 of FIG. 1). During message consumption, messages arriving at a destination on a broker are delivered over a connection to the message queue client run-time 202 if the client has set up a consumer for a given destination, the selection criteria for the consumer match that of messages arriving at the given destination, and the connection has been told to start delivery of messages. Messages delivered over the connection are distributed to the appropriate message queue sessions.

Data streams are exposed and can be explicitly addressed by either a topic, a partition or a combination thereof in the global topics pool 212. More specifically, the program-specific logic and regions or sections of the code 204 may be marked up with global descriptors such as a language-specific keywords mapping to an API or with the language-generic pragma code words, wrapped up in comments of the programming language. In the latter case, such code words are processed not by the programming language compiler, but by an additional processor (e.g., pre-processor). As such, the programming language compiler cannot inter-operate with the language (e.g., exchange values and variables). Conversely, language-specific API extends the language, and may be processed with a compiler or an interpreter and allows interaction with the language.

In one aspect, global descriptors are maintained at the cluster management entity 222 and then exposed to the executing program on each stream processing node via an API. The descriptors may expose to the program information such as the global count of processing nodes in the cluster, the numerical identifier (rank) of the processing node where the specific program executable code is running, the character (system) name of the processing node where the specific program executable code is running, global count of streaming topics in the broker cluster, the numerical identifier (rank) of the topic, the section of the code is working on (processing), the character (system) name of the topic, capability to group streams or topics into programmatically defined groups on multiple levels (sets, subsets, etc.), capability to group processing nodes into programmatically defined groups on multiple levels (sets, subsets, etc.), capability to assign stream processing to specific processing nodes, capability to assign stream operations and input/output to the data from specific streams (i.e., topics) or groups of streams, and capability to exchange data between executable code copies executed on specific processing nodes.

The descriptors may be mapped to various pragmas or values such as keywords and parameters. For example, the rank of each node (e.g., a sequential integer count of the stream processing nodes joining the cluster) may be mapped to the proc_rank pragma. Ranks persist for the duration of the active phase of the node. In another example, the name of each node as specified by node or during service setup may be mapped to the proc_name pragma. Finally, the total count of active processing nodes in a cluster may be mapped to the proc_size pragma. Similarly, the rank of each topic or stream, name of each topic or stream, and the total count of deployed and active streams may be mapped to various pragmas or values such as stream_rank, stream_name, and stream_size, respectively.

The abstract run-time environment 202 interacts with a service discovery component 224 of a cluster management entity 222 (corresponding to the cluster management entity 126 of FIG. 1), which maintains the global descriptors and acts as an advertisement endpoint. The service discovery component 224 provides service discovery of both stream processing nodes and streams. The cluster management entity 222 dynamically, automatically, and sequentially assigns the rank to each new node being added to the node cluster in the stream processor pool 218 with the naming convention configured in the node cluster. The specification of cluster functional sets is done in a cluster configuration. The service discovery component 224 then propagates this information and related pragmas or values (e.g., stream_rank, proc_rank, stream_size, and proc_size) to nodes 210(1)-210(N) in the stream processor pool 218, which pass the information to the program code 204 (e.g., via API) at run-time. This allows implementing dynamic distributed service discovery and dynamic handling on scaling the cluster up or down. The cluster management entity 222 may also keep the time-stamped log of the state of the system to be able to resolve consistency in the processing state, and for audit purposes.

As each program executable is automatically distributed to the individual processing nodes in the stream processor pool, the descriptors in the program-specific logic and regions or sections of the code specifies which nodes that the code must execute on, and which stream to use. These descriptors allow the program to access a cluster metadata 220 defined dynamically in the cluster topology. In the illustrated embodiment, the marked-up regions 206(1)-206(N) of the code 204 can access (reads/writes/updates/deletes) specific subset of streams (e.g., in the global topics pool 212) and is executed on a specific subset of nodes (e.g., in the processing nodes pool 218) according to the descriptors, which are resolved to values corresponding to keywords or parameters identifying specific nodes and streams during execution.

More specifically, the first marked-up region 206(1) specifies the first subset of streams 214 in the global topics pool 212 to create and read from. The second marked-up region 206(2) specifies the second subset of streams 216 in the global topics pool 212 to create, write to, and read from. The streams may be defined by one or more descriptors (e.g., stream_rank, stream_name, stream_size, etc.). The global topics pool 212, the first subset of streams 214, and the second subset of streams 216 can correspond to the global topics pool 136, the incoming topics pool 110, and the aggregating topics pool 116 of FIG. 1, respectively.

The third marked-up region 206(N) of the code 204 is executed on a specific processing node 210(1) according to the mark-up API instructions (e.g., grouped or specified by rank, range, or keyword), which are resolved to values identifying the specific processing node 210(1) of the plurality of stream processing nodes 210(1)-210(N) in the stream processor pool 218 during execution. The stream processor pool 218 and the processing nodes 210(1)-210(N) can correspond to the stream processor pool 120 and the stream processors 122 and 124 of FIG. 1, respectively.

Example Computing Device Components

Figure 3:
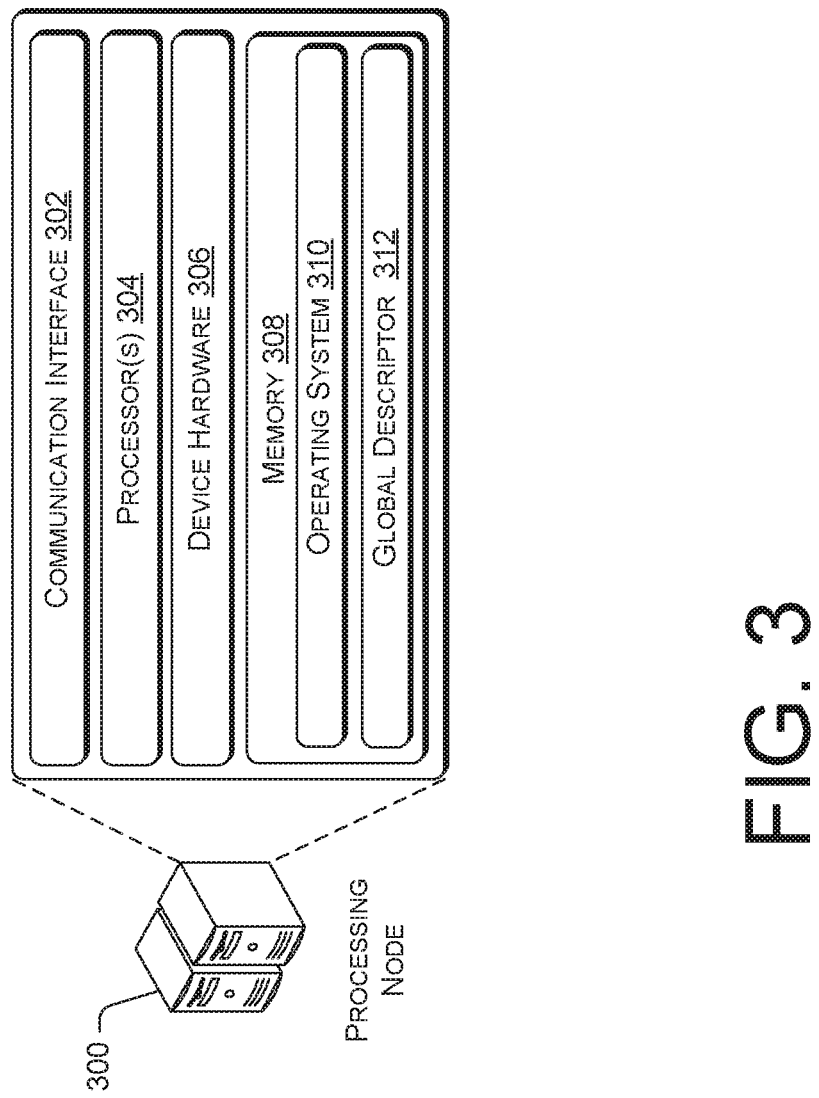
FIG. 3 is a block diagram showing various components of an illustrative computing device such as a stream processing node within which a set of instructions may be executed to cause the processing node to perform any one or more of the methodologies discussed herein.

FIG. 3 is a block diagram showing various components of an illustrative computing device, wherein the computing device may comprise a stream processing node 300. It is noted that the stream processing node 300 as described herein can operate with more or fewer of the components shown herein. Additionally, the stream processing node 300 as shown herein or portions thereof can serve as a representation of one or more of the computing devices of the present system.

The stream processing node 300 may include a communication interface 302, one or more processors 304, hardware 306, and memory 308. The communication interface 302 may include wireless and/or wired communication components that enable the stream processing node 300 to transmit data to and receive data from other networked devices. In at least one example, the one or more processor(s) 304 may be a central processing unit(s) (CPU), graphics processing unit(s) (GPU), both a CPU and GPU or any other sort of processing unit(s). Each of the one or more processor(s) 304 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution.

The one or more processor(s) 304 may also be responsible for executing all computer applications stored in the memory, which can be associated with common types of volatile (RAM) and/or nonvolatile (ROM) memory. The hardware 306 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 308 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 308 may also include a firewall. In some embodiments, the firewall may be implemented as hardware 306 in the stream processing node 300.

The processors 304 and the memory 308 of the stream processing node 300 may implement an operating system 310. The operating system 310 may include components that enable the stream processing node 300 to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system. The memory 308 of the stream processing node 300 may also store at least one global descriptor 312. The global descriptor 312 may comprise the numerical identifier (rank) of the processing node 300 and the character (system) name of the processing node 300.

Figure 4:
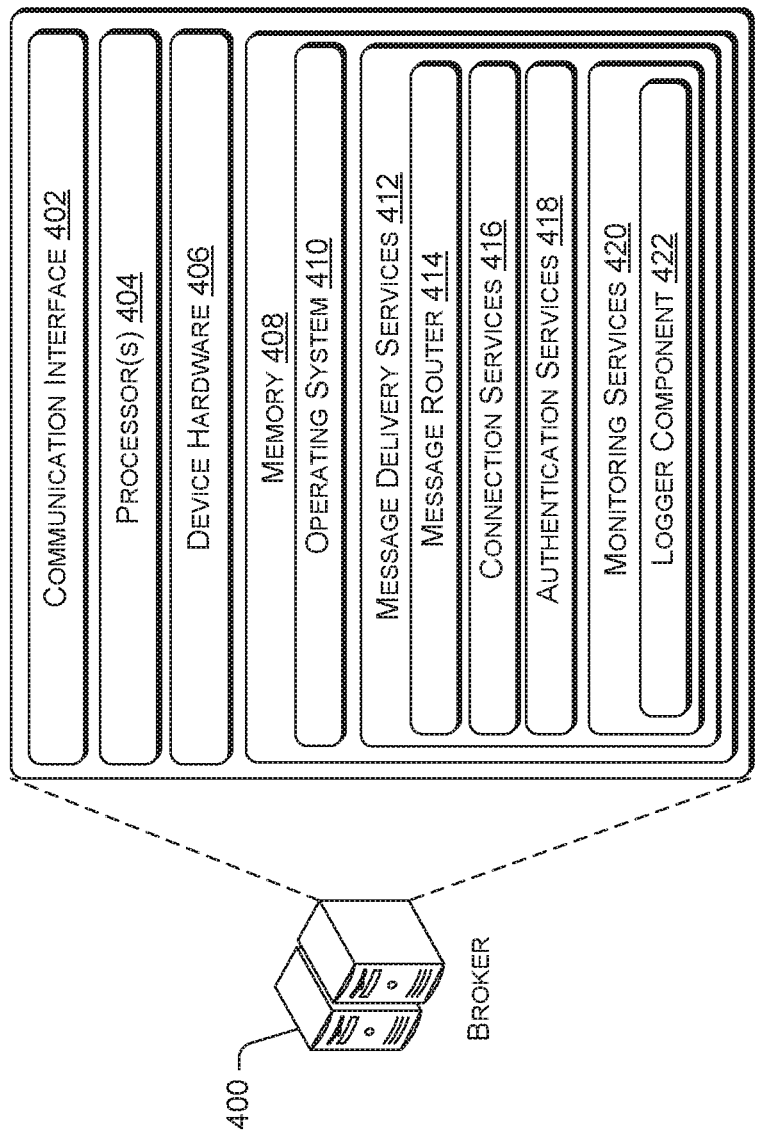
FIG. 4 is a block diagram showing various components of an illustrative computing device such as a broker or a stream that performs stream read and write operations.

FIG. 4 is a block diagram showing various components of an illustrative computing device, wherein the computing device may comprise a broker 400. It is noted that the broker 400 as described herein can operate with more or fewer of the components shown herein. Additionally, the broker 400 as shown herein or portions thereof can serve as a representation of one or more of the computing devices of the present system.

The broker 400 may include a communication interface 402, one or more processors 404, hardware 406, and memory 408. The communication interface 402 may include wireless and/or wired communication components that enable the broker 400 to transmit data to and receive data from other networked devices. In at least one example, the one or more processor(s) 404 may be a central processing unit(s) (CPU), graphics processing unit(s) (GPU), both a CPU and GPU or any other sort of processing unit(s). Each of the one or more processor(s) 404 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution.

The one or more processor(s) 404 may also be responsible for executing all computer applications stored in the memory, which can be associated with common types of volatile (RAM) and/or nonvolatile (ROM) memory. The hardware 406 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 408 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 408 may also include a firewall. In some embodiments, the firewall may be implemented as hardware 406 in the broker 400.

The processors 404 and the memory 408 of the stream processing node 300 may implement an operating system 410 and message delivery services 412. The operating system 410 may include components that enable the broker 400 to receive and transmit data via various interfaces (e.g., user controls, communication interface, and/or memory input/output devices), as well as process data using the processors 404 to generate output. The operating system 410 may include a presentation component that presents the output (e.g., display the data on an electronic display, store the data in memory, transmit the data to another electronic device, etc.). Additionally, the operating system 410 may include other components that perform various additional functions generally associated with an operating system.

The message delivery services 412 include a message router 414, connection services 416, authentication services 418, and monitoring services 420. In some aspects, the message router 414 may perform reliable delivery. This process is two-fold. First, the message router 414 assures that the delivery of messages to and from the broker 400 is successful via an acknowledgment. Second, the message router 414 assures that the broker 400 does not lose messages or delivery information before messages are delivered. In this case, the message router 414 may pass messages to a persistence manager that manages the writing of data to persistent storage or a database and retrieval of this information so that the message can be recovered if the broker 400 fails. When the broker 400 restarts, it recreates destinations and durable subscriptions, recovers persistent messages, restores the state of all transactions, and recreates its routing table for undelivered messages. It can then resume message delivery.

The connection services 416 manages the physical connection between the broker 400 and clients, providing transport for incoming and outgoing messages. In one aspect, the connection services 416 may include a port mapper that maps ports to the different connection services 416 which may support communication with various types of clients. Because each connection service 416 is multi-threaded (i.e., supporting multiple connections), the threads needed for these connections may be maintained in a thread pool managed by a third pool manager component. The threads in a thread pool can either be dedicated to a single connection (i.e., dedicated model) or assigned to multiple connections, as needed (i.e., shared model).

The authentication services 418 manage connections to the broker and access control for authenticated users. The authentication services 418 may support password-based authentication. Once the user of a client application is authenticated, the user can be authorized to perform various message queue-related activities (e.g., establishing a connection with a broker, accessing destinations such as creating a consumer, a producer, or a queue browser for any given destination or all destinations, auto-creating destinations) based on permission. The authentication services 418 may support both user-based and group-based access control. Additionally, the authentication services 418 may support encryption functions based on the Secure Socket Layer (SSL) standard, which provides security at a connection level by establishing an encrypted connection between an SSL-enabled broker and an SSL-enabled client.

The monitoring services 420 generate metrics and diagnostic information that can be written via a logger component 422 to a number of output channels that an administrator can use to monitor and manage the broker 400. The monitoring services 420 may provide information about broker activity, such as message flow in and out of the broker 400, the number of messages in the memory 408 and the memory they consume, the number of connections open, the number of threads being used, and/or so forth. The logger component 422 takes the generated metrics information and writes that information to a number of output channels such as a log file.

Example Processes

Figure 5:
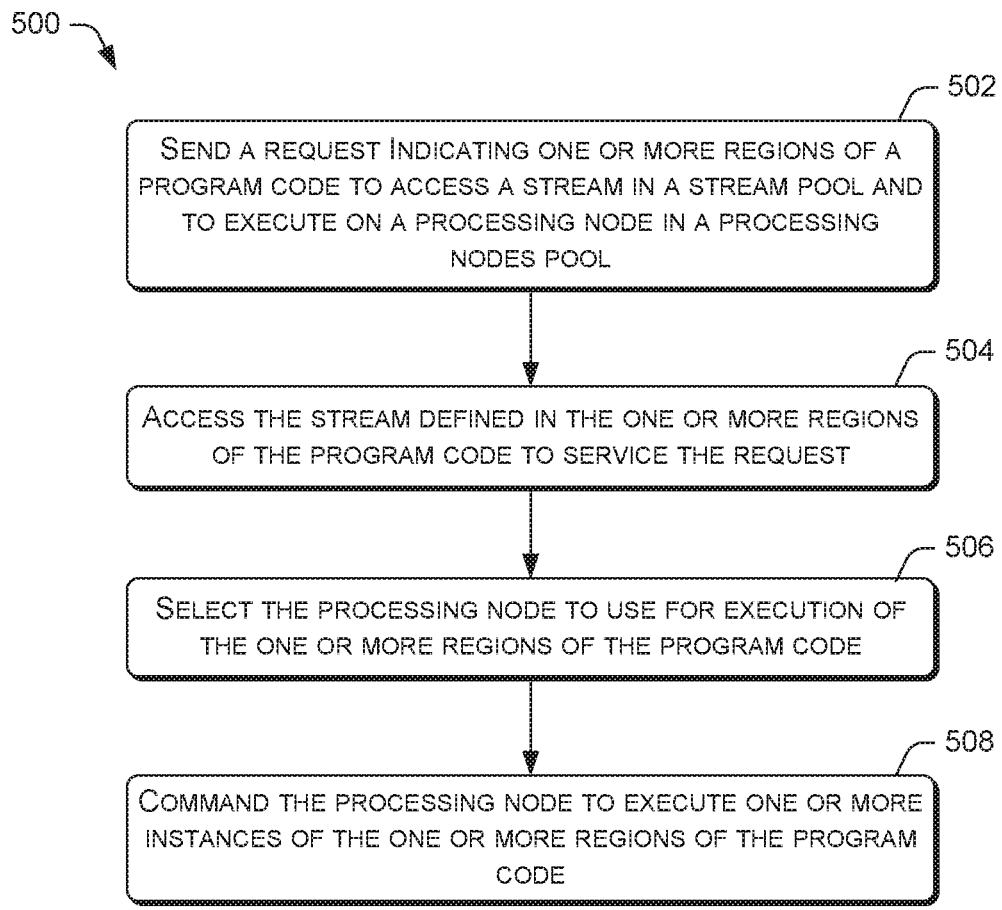
FIG. 5 is a flow diagram of an example process for distributed data stream programming and processing.

FIG. 5 is a flow diagram of an example process for distributed data stream programming and processing. The process 500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process 500 is described with reference to FIGS. 1-4.

FIG. 5 is a flow diagram of an example process 500 for distributed data stream programming and processing. At block 502, a client application sends a request indicating one or more regions of program code to access a topic or stream in a stream pool and to execute on a processing node in a processing nodes pool. The program is distributed across all processing nodes in the processing nodes pool and has access to all topics or streams in the topics pool. At block 504, the client application accesses the stream defined by a global descriptor in the one or more regions of the program code to service the request. For example, the descriptors may be mapped to various pragmas or values such as keywords and parameters such as a total count of deployed and active streams, mapping of stream_size pragma, which may have multiple levels if partitions or sub-streams are supported. In some aspects, an array or a list may be used to express the hierarchy in the implementation. The various pragmas or values may also include the name of each stream, sub-stream, or partition, stream_rank maps to topic rank, sub-rank maps to partition. Computing nodes can write to and read from topic or group of topics specified either by stream_rank or by a set or range of stream_ranks or by specific names (e.g., in a list). Thus, the sending process does not need the receiving process identifier as only the topic or group abstraction of topics where it is writing to is included.

At block 506, the client application selects the processing node to use for execution of the one or more regions of the program code. The selection may be also based at least on the descriptor marked up in the one or more regions of the program code. The descriptor may be mapped to various pragmas or values including the total count of deployed and active computing nodes providing services, mapping of the proc_size pragma, name of each node as specified by node or during service setup, mapping of the proc_name pragma (or node_name), rank of each node (e.g., a sequential integer count of the nodes joining the cluster), and mapping of the proc_rank pragma. Even though individual processing nodes in the processing nodes pool may retain their checkpoint information (i.e., the state of processing they were in when the node became inactive), the rank should not be preserved to ensure that there are no gaps in the ranks and all active nodes must rank from 1 to proc_size. At block 508, the client application commands the selected processing node to execute one or more instances of the one or more regions of the program code.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
sending a request indicating one or more regions of program code to access a stream in a stream pool and to execute on a processing node in a processing nodes pool, the processing node corresponding to a stream rank of the stream;
accessing the stream defined in the one or more regions of the program code to service the request;
selecting the processing node to use for execution of the one or more regions of the program code based at least on the stream rank of the stream; and
commanding the processing node to execute one or more instances of the one or more regions of the program code.

2. The one or more non-transitory computer-readable media of claim 1, wherein the one or more regions of the program code comprises a global descriptor corresponding to rank information of the processing node.

3. The one or more non-transitory computer-readable media of claim 1, wherein the one or more regions of the program code defines a global descriptor corresponding to the stream rank of the stream.

4. The one or more non-transitory computer-readable media of claim 1, wherein the stream comprises one or more partitions and the one or more regions of the program code define a global descriptor corresponding to the one or more partitions.

5. The one or more non-transitory computer-readable media of claim 4, wherein the acts further comprise:
accessing the one or more partitions corresponding to the global descriptor to service the request.

6. The one or more non-transitory computer-readable media of claim 1, wherein the one or more regions of the program code is marked up with language-specific keywords mapping to an application programming interface (API).

7. The one or more non-transitory computer-readable media of claim 1, wherein the stream rank maps to a topic rank that is associated with a topic; and
selecting the processing node to use for execution of the one or more regions of the program code based at least on the topic specified by the stream rank.

8. A computer-implemented method, comprising:
sending a request indicating one or more regions of a program code to access a stream in a stream pool and to execute on a processing node in a processing nodes pool, the processing node corresponding to a stream rank of the stream;
accessing the stream defined in the one or more regions of the program code to service the request;
selecting the processing node to use for execution of the one or more regions of the program code based at least on the stream rank of the stream; and
commanding the processing node to execute one or more instances of the one or more regions of the program code.

9. The computer-implemented method of claim 8, wherein the one or more regions of the program code comprises a global descriptor corresponding to a name of the processing node.

10. The computer-implemented method of claim 8, wherein the processing node is selected to load balance the request.

11. The computer-implemented method of claim 8, wherein the one or more regions of the program code defines a global descriptor corresponding to a name of the stream.

12. The computer-implemented method of claim 8, wherein the stream comprises one or more partitions and the one or more regions of the program code define a global descriptor corresponding to the one or more partitions.

13. The computer-implemented method of claim 12, further comprising:
accessing the one or more partitions corresponding to the global descriptor to service the request.

14. The computer-implemented method of claim 8, wherein the one or more regions of the program code is marked up with a language-generic pragma code words.

15. A system, comprising:
one or more non-transitory storage mediums configured to provide stored computer-readable instructions, the one or more non-transitory storage mediums coupled to one or more processors, the one or more processors configured to execute the computer-readable instructions to cause the one or more processors to:

send a request indicating one or more regions of a program code to access a stream in a stream pool and to execute on a processing node in a processing nodes pool, the processing node corresponding to a stream rank of the stream;

access the stream defined in the one or more regions of the program code to service the request;

select the processing node to use for execution of the one or more regions of the program code based at least on the stream rank of the stream; and command the processing node to execute one or more instances of the one or more regions of the program code.

16. The system of claim 15, wherein the one or more regions of the program code comprises a global descriptor corresponding to a group of processing nodes comprising the processing node.

17. The system of claim 15, wherein the one or more regions of the program code defines a global descriptor corresponding to a range of stream ranks of the stream.

18. The system of claim 15, wherein the stream comprises one or more partitions and the one or more regions of the program code define a global descriptor corresponding to the one or more partitions.

19. The system of claim 18, wherein the instructions further cause the one or more processors to:

access the one or more partitions corresponding to the global descriptor to service the request.

20. The system of claim 15, wherein the one or more regions of the program code comprises a global descriptor corresponding to a total number of processing nodes in the processing nodes pool.

* * * * *